US012786406B2

(12) United States Patent
Yang

(10) Patent No.: US 12,786,406 B2
(45) Date of Patent: Nov. 3, 2026

(54) WORKLOAD BALANCING FOR MULTI-CORE VIDEO SYSTEM

(71) Applicant: QUALCOMM Incorporated, San Diego, CA (US)

(72) Inventor: Shengqi Yang, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/061,404

(22) Filed: Feb. 24, 2025

(65) Prior Publication Data

US 2026/0254961 A1 Aug. 27, 2026

(51) Int. Cl.
*H04N 19/127* (2014.01)
*H04N 19/177* (2014.01)
*H04N 19/436* (2014.01)

(52) U.S. Cl.
CPC ......... *H04N 19/127* (2014.11); *H04N 19/177* (2014.11); *H04N 19/436* (2014.11)

(58) Field of Classification Search
None
See application file for complete search history.

(56) References Cited

U.S. PATENT DOCUMENTS 10,701,378 B2 6/2020 Ryu
2008/0025409 A1* 1/2008 Tseng .................... H04N 19/44 375/E7.1
2013/0101035 A1* 4/2013 Wang .................. H04N 19/174 375/E7.243

FOREIGN PATENT DOCUMENTS

WO 2024144957 A1 7/2024

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Benmoussa Y., et al., "A Methodology for Performance/Energy Consumption and Modeling of Video Decoding on Heterogeneous SoC and Its Applications", Journal of Systems Architecture, vol. 61, No. 1, Dec. 6, 2014, XP029128323, pp. 49-70, Sec. 2, figure 1.

(Continued)

*Primary Examiner* — Rebecca A Volentine
(74) *Attorney, Agent, or Firm* — Shumaker & Sieffert, P.A.

(57) ABSTRACT

An apparatus configured to code video data comprises a first video core, a second video core, and a controller. The controller is configured to receive information about a first coding session and a second coding session. Based on the information, the controller is configured to determine an average workload requirement for the first coding session and the second coding session. The controller is further configured to determine an operation corner based on the average workload requirement and to then operate the first video core and the second video core at a voltage corresponding to the operation corner. The controller is further configured to allocate first interleaved portions of the first coding session and the second coding session to the first video core and to allocate second interleaved portions of the first coding session and the second coding session to the second video core.

20 Claims, 10 Drawing Sheets

(56) References Cited

OTHER PUBLICATIONS

International Search Report and Written Opinion—PCT/US2026/015040—ISA/EPO—Jun. 10, 2026.
Nogues E., et al., "Efficient DVFS For Low Power HEVC Software Decoder", Journal of Real-time Image Processing Springer, DE, vol. 13, No. 1, Aug. 4, 2016, XP036207599, pp. 39-54, Sec. 2.4, 3.1.3, figures 2-4.
Rasoolzadeh S., et al., "Estimating Application Workload Uding Hardware Performance Counters in Real-Time Video Encoding", 7'th International Symposium on Telecommunications (IST'2014) IEEE, Sep. 9, 2014, XP032715492, pp. 307-311, Sec. II.C.
Sankaraiah S., et al., "Performance Optmization of Video Coding Process on Multi-Core Using Gop Level Parallellism", International Journal of Parallel Programming. Plenum Press, New York, US, vol. 42, No. 6, Sep. 17, 2013, XP035381658, pp. 931-947, figure 2.

* cited by examiner

500

| | | | |
|---|---|---|---|
| CODING SESSION 1 | W | H | FPS |
| 1080P24FPS DECODE | 1920 | 1080 | 24 |
| | | | |
| CODING SESSION 2 | W | H | FPS |
| 4K24FPS ENCODE | 3840 | 2160 | 24 |
| | | | |

FIG. 5

600

| OPERATION CORNERS | |
|---|---|
| CORNER | VOLTAGE |
| L8 | 0.85V |
| L7 | 0.80V |
| L6 | 0.75V |
| L5 | 0.70V |
| L4 | 0.65V |
| L3 | 0.60V |
| L2 | 0.55V |
| L1 | 0.50V |

FIG. 6

700

| OPERATION CORNER | L1 | L2 | L3 | L4 | L5 | L6 |
|---|---|---|---|---|---|---|
| HARDWARE FREQUENCY | 250MHz | 350MHz | 450MHz | 500MHz | 550MHz | 600MHz |

FIG. 7

WORKLOAD BALANCING FOR MULTI-CORE VIDEO SYSTEM

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Certain applications, such as video transcoding or editing, may involve multiple coding sessions. For example, a bitstream may be decoded and re-encoded at a higher or lower resolution and/or frame rate to adapt the bitstream to the specifications of a display device.

SUMMARY

In general, this disclosure describes techniques for video encoding and decoding, including techniques for workload balancing in a multi-core video system. Multi-core video systems may be used in applications that involve multiple coding sessions to improve throughput by performing two or more coding sessions in parallel on two or more video cores. The coding sessions may include multiple encoding sessions, multiple decoding sessions, or both encoding and decoding sessions. Multi-core video coding systems may suffer from power inefficiencies and overutilization/underutilization of video cores as a result of unbalanced workloads. In examples of this disclosure, workload balancing techniques are applied to allocate similar workloads to video cores of a multi-core video system regardless of whether the video cores are to perform coding sessions with unbalanced workload requirements at least partially in parallel with one another.

In an example of this disclosure, an apparatus configured to code video data comprises a first video core, a second video core, and a controller. The controller is configured to receive information about a first coding session and a second coding session. Based on the information, the controller is configured to determine an average workload requirement for the first coding session and the second coding session. The controller is further configured to determine an operation corner based on the average workload requirement and to then operate the first video core and the second video core at a voltage corresponding to the operation corner. The controller is further configured to allocate first interleaved portions of the first coding session and the second coding session to the first video core and to allocate second interleaved portions of the first coding session and the second coding session to the second video core.

In another example of this disclosure, a method for coding video data comprises: receiving, by a controller, information about a first coding session and a second coding session; based on the information, determining, by the controller, an average workload requirement for the first coding session and the second coding session; determining, by the controller, an operation corner based on the average workload requirement; operating, by the controller, a first video core and a second video core at a voltage corresponding to the operation corner; allocating, by the controller, first interleaved portions of the first coding session and the second coding session to the first video core; and allocating, by the controller, second interleaved portions of the first coding session and the second coding session to the second video core to perform the first coding session and the second coding session at least partially in parallel.

In another example of this disclosure, an apparatus configured to code video data comprises a plurality of video cores and a controller. The controller is configured to receive information about a plurality of coding sessions to be performed at least partially in parallel by the plurality of video cores. Based on the information, the controller is configured to determine an average workload requirement for the plurality of coding sessions. The controller is further configured to determine an operation corner based on the average workload requirement and to then operate the plurality of video cores at a voltage corresponding to the operation corner. The controller is further configured to allocate interleaved portions of the plurality of coding sessions to the plurality of video cores.

The details of one or more examples are set forth in the accompanying drawings and the description below. Other features, objects, and advantages will be apparent from the description, drawings, and claims.

BRIEF DESCRIPTION OF DRAWINGS

FIG. 5 is a table illustrating an example of unbalanced coding sessions that can be performed at least partially in parallel on multiple video cores.

FIG. 6 is a table illustrating an example of video hardware operation corners and corresponding voltages.

FIG. 7 is a table illustrating an example of video hardware operation corners and corresponding hardware cycles.

DETAILED DESCRIPTION

Figure 1:
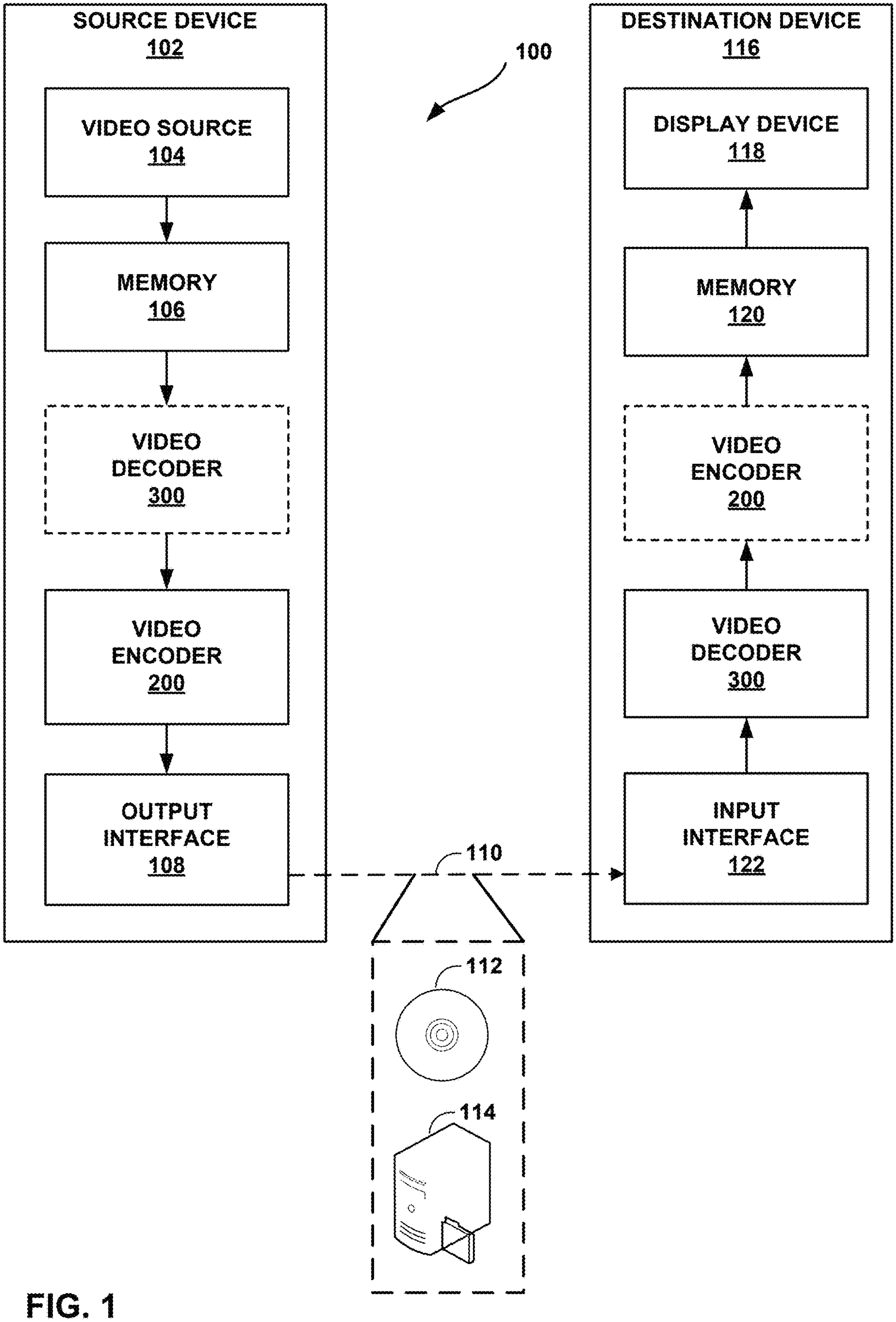
FIG. 1 is a block diagram illustrating an example video encoding and decoding system that may perform the techniques of this disclosure.

Certain applications, such as video transcoding or editing, may involve multiple coding sessions. For example, a bitstream may be decoded and re-encoded at a higher or lower resolution and/or frame rate to adapt the bitstream to the specifications of a display device. To improve throughput, a video system may include multiple video cores that can perform coding sessions in parallel.

Video systems with multiple cores typically operate according to an operation corner (i.e., in a power mode) that meets workload requirements of all coding sessions to be performed in parallel by the multiple cores. For example, in a dual core video system, if a first video core is to complete a first coding session and a second video core is to complete a second coding session, at least partially in parallel with one another, then the first and second video cores may be operated at a voltage corresponding to an operation corner that fulfills the higher of: (a) the workload requirement of the first coding session; or (b) the workload requirement of the second coding session. If the workload requirements of the coding sessions are similar, there may not be an issue. However, in situations where the workloads are unbalanced, it can be wasteful to operate all the video cores of a video system according to an operation corner that fulfills the highest coding session workload requirement at any given time. For in instance, in the dual core example above, if the first coding session has a higher workload requirement than the second coding session, the result may be that the second video core is operated according to a higher operation corner, hence a higher voltage, than necessary to complete the second coding session. The foregoing scenario may lead to inefficient power consumption and resource utilization by the system. For example, the second video core may be driven at a higher voltage (consuming more power and operating at a higher frequency) than necessary, and the second video core may also be underutilized (while the first video core is overutilized) because the second video core may complete the second coding session and sit idle while the first video core is still completing the first coding session.

This disclosure describes techniques that may improve power efficiency and resource utilization by allocating balanced workloads to video cores of a multi-core video system regardless of differences in respective workloads of coding sessions to be performed at least partially in parallel by the video cores. In some examples, an operation corner that fulfills an average workload requirement of the coding sessions to be performed at least partially in parallel by the video cores is determined. Then the video cores are operated at a voltage corresponding to the operation corner, and portions of the coding sessions (e.g., groups of pictures (GOPs), or other substantially uniformly sized divisions of a bitstream) are allocated to the video cores in an interleaved manner. For example, portions of a first coding session and a second coding session may be interleaved and allocated to a first video core while other portions of the first coding session and the second coding session are interleaved and allocated to a second video core. This approach may balance the workload across the video cores such that none of the video cores are overutilized or underutilized. Additionally, the video cores may be operated at an optimized operation corner that is based on an average workload requirement, rather than a highest workload requirement, of coding sessions that are to be performed at least partially in parallel by the video cores.

FIG. 1 is a block diagram illustrating an example video encoding and decoding system 100 that may perform the techniques of this disclosure. The techniques of this disclosure are generally directed to architectures for coding (encoding and/or decoding) video data. In general, video data includes any data for processing a video. Thus, video data may include raw, unencoded video, encoded video, decoded (e.g., reconstructed) video, depth buffers, alpha channels, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as VR headsets, AR glasses, head mounted displays (HMDs), smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. Video encoder 200 and video decoder 300 may be configured to apply techniques of this disclosure, including workload balancing techniques.

Source device 102 may represent an example of a video encoding device, while destination device 116 may represent an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

Optionally, source device 102 may also include video decoder 300, and similarly, destination device 116 may also include video encoder 200. In such examples, source device 102 and/or destination device 116 may be configured to perform transcoding (e.g., decoding and re-encoding) operations.

System 100 as shown in FIG. 1 is merely one example. In general, any digital video encoding and/or decoding device with multiple video cores may perform the workload balancing techniques described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, XR real-time gaming, split rendering, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), real-time transport protocol (RTP), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, ILBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. The processing system may include at least one processor with multiple cores. For example, a dual core video system may include two video cores, a quad-core video system may include four video cores, and so on. In general, a multi-core video system may include any number of video cores configured to perform encoding and/or decoding. An advantage of such systems may be the ability to perform multiple coding sessions (e.g., simultaneous decoding and encoding sessions, multiple decoding sessions, multiple encoding sessions, and/or multiple simultaneous decoding and encoding sessions) in parallel by allocating coding sessions to respective video cores, or by allocating interleaved portions of coding sessions to respective video cores according to the techniques of this disclosure. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the workload balancing techniques of this disclosure within any multi-core video system.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions. Video data may further include depth channels and/or alpha channels, which are not visual YUV channels, but may be interpreted as Y channels for coding purposes. In other examples, YUV video data may be combined with other 2D non-visual data that can benefit from video coding.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUS having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Any of the video encoding or video decoding processes described above may be performed using a neural network (NN). Additionally or alternatively, a neural network may be trained to efficiently compress video data without necessarily separately performing prediction and residual coding. Studies have shown that embedding neural networks into the hybrid video coding framework of video encoder 200 and video decoder 300 can improve compression efficiency. Neural networks may be used for intra prediction and inter prediction to improve the prediction efficiency. NN-based in-loop filtering and/or post-filtering have also performed well in heuristic testing.

For example, video encoder 200 and video decoder may use one or more NN-based filters for existing filters, such as deblocking filters, sample adaptive offset (SAO), and/or adaptive loop filtering (ALF). NN-based filters can also be applied exclusively, where NN-based filters are designed to replace all of the existing filters. Additionally or alternatively, NN-based filters may be designed to supplement, enhance, or replace any or all of the other filters.

In some examples, an NN-based filter may be a convolutional neural network (CNN)-based filter with multiple layers. An NN-based filtering process may take reconstructed samples as inputs, and may add the intermediate outputs back to the inputs to refine the input samples. The NN-based filter may use all color components (e.g., Y, U, and V, or Y, Cb, and Cr) as inputs 172 to exploit cross-component correlations. Different color components may share the same filters (including network structure and model parameters) or each component may have its own specific filters.

The filtering process can also be generalized as follows:

$$R'(i,j)=R(i,j)+NN\_\text{filter\_residual\_ouput}(R)$$

Here, R(i, j) represents a reconstructed sample at position (i, j) in the picture, R'(i, j) represents the filtered version of the reconstructed sample, and NN_filter_residaul_output(R) represents the intermediate samples discussed above that are calculated by the NN filter. The model structure and model parameters of NN-based filter(s) can be pre-defined and be stored at video encoder 200 and video decoder 300. The filters can also be signaled in the bitstream.

In some examples, an NN-based filter may include a series of feature extraction layers, followed by an output convolution. The feature extraction layers may include a 3×3 convolution (conv) layer followed by a parametric rectified linear unit (PRELU) layer. The convolutional layer applies a convolution operation to the input data, which involves a filter or kernel processing the input data (e.g., the reconstruction samples) in a sliding window fashion and computing dot products at each position. The convolution operation essentially captures local patterns within the input data. For example, in the context of image processing, these patterns could be edges, textures, or other visual features. The filter or kernel is a small matrix of weights that gets updated during the training process. By sliding this filter across the input data (or feature map from a previous layer) and computing the dot product at each position, the convolutional layer creates a feature map that encodes spatial hierarchies and patterns detected in the input. The output of a convolutional layer is a set of feature maps, each corresponding to one filter, capturing different aspects of the input data. This layer helps the neural network to learn increasingly complex and abstract features as the data passes through deeper layers of the network.

The PRELU layer is an activation function used in neural networks, and is a variant of the ReLU (Rectified Linear Unit) activation function. As described above, the convolution layer outputs feature maps, each corresponding to one filter, representing detected features in the input. Following the convolution layer, the PRELU layer applies the PRELU activation function to each element of the feature maps produced by the convolution layer. For positive values, the PRELU layer acts like a standard ReLU, passing the value through. For negative values, instead of setting them to zero (e.g., as ReLU does), the PRELU layer allows a small, linear, negative output. This keeps neurons of the NN active and maintains the gradient flow, which can be beneficial for learning in deep networks.

When NN-based filtering is applied in video coding, the whole video signal (pixel data) may be split into multiple processing units (e.g., 2D blocks), and each processing unit can be processed separately or be combined with other information associated with this block of pixels. For example, a processing unit may be a frame, a slice/tile, a CTU, or any pre-defined or signaled shapes and sizes. Typically, NN-based filtering is performed on reconstructed blocks of video data. Here, reconstructed blocks and samples may refer to both decoded blocks produced by video decoder 300, as well blocks reconstructed in a reconstruction loop of video encoder 200.

To further improve the performance of NN-based filtering, different types of input data can be processed jointly to produce the filtered output. Input data may include, but is not limited to, reconstruction pixels/samples, prediction pixels/samples, pixels/samples after the loop filter(s), partitioning structure information, deblocking parameters (e.g., boundary strength (BS)), quantization parameter (QP) values, slice or picture types, or a filters applicability or coding modes map. Input data can be provided at different granularities. Luma reconstruction and prediction samples may be provided at the original resolution, whereas chroma samples may be provided at lower resolution, e.g. for 4:2:0 representation, or can be up-sampled to the Luma resolution to achieve per-pixel representation. Similarly, QP, BS, partitioning, or coding mode information can be provided at lower resolution, including cases with a single value per frame, slice or processing block (e.g. QP). In other examples, QP, BS, partitioning, or coding mode information can be expanded (e.g., replicated) to achieve per-pixel/sample representation.

To further improve the performance of NN-based filtering, multi-mode solutions can be used. For example, for each processing unit, video encoder 200 may select a mode from a set of modes based on rate-distortion optimization and signal the selected mode in the bit-stream. The different modes may include different NN models, different values that may be used as the input information of the NN models, etc. In one example, video encoder 200 and video decoder 300 may use an NN-based filtering solution with multiple modes based on a single NN model by using different QP values as input to the NN model for different modes.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As will be explained in more detail below, this disclosure describes techniques for video encoding and decoding, including workload balancing techniques that may improve resource utilization and power efficiency of video hardware that implements video encoder 200 and/or video decoder 300. In examples of this disclosure, video encoder 200 and/or video decoder 300 may be implemented by video hardware comprising a plurality of video cores. The video cores may be configured to perform multiple coding sessions at least partially in parallel. The video cores may be controlled by a controller (e.g., any combination of hardware, firmware, and/or software) configured to perform techniques of this disclosure.

In some examples, the controller is configured to determine an average workload requirement of coding sessions to be performed in parallel by video cores, and the controller then determines an operation corner that fulfills the average workload requirement. The controller may be further configured to operate the video cores at a voltage corresponding to the operation corner and to allocate portions of the coding sessions (e.g., GOPs or other substantially uniformly sized divisions of a bitstream) to the video cores in an interleaved manner. For instance, in a dual core video system, the controller may be configured to allocate (first) interleaved portions of a first coding session and a second coding session to a first video core and further configured to allocate other (second) interleaved portions of the first coding session and the second coding session to a second video core. In this manner, the video cores may receive similar workloads even if the workloads of the coding sessions themselves are unbalanced.

Figure 2:
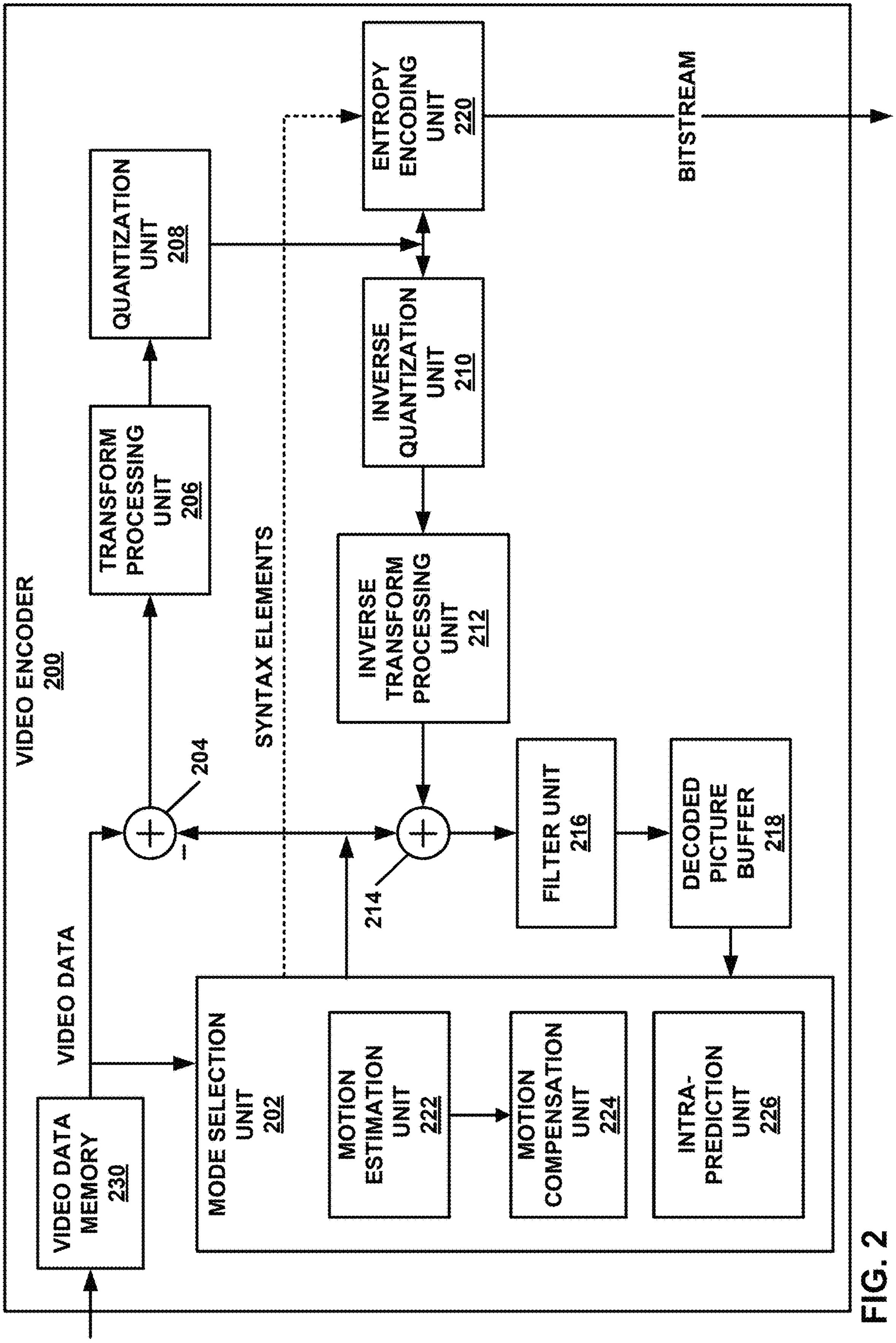
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUS, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 3:
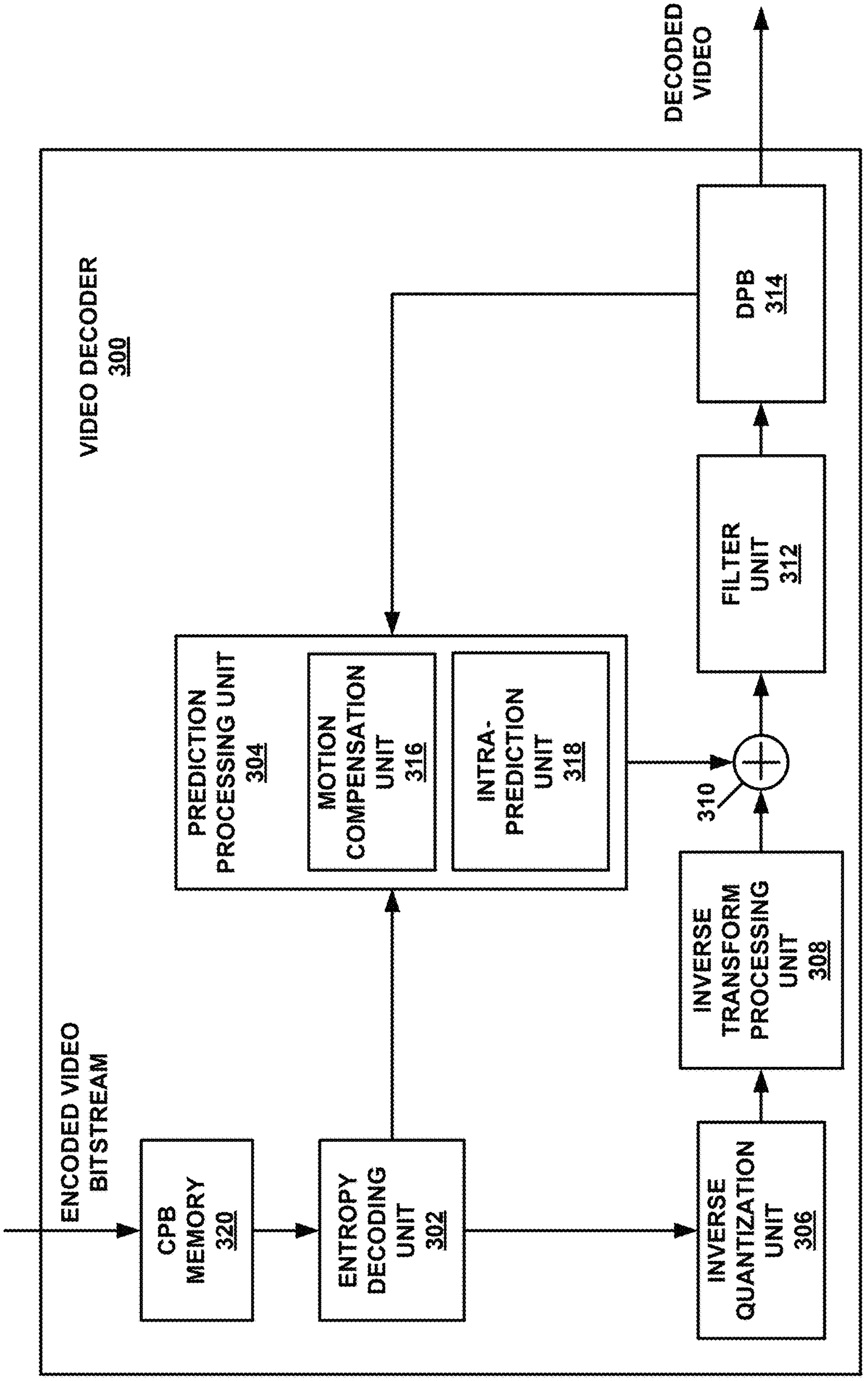
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a “current block”).

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 4:
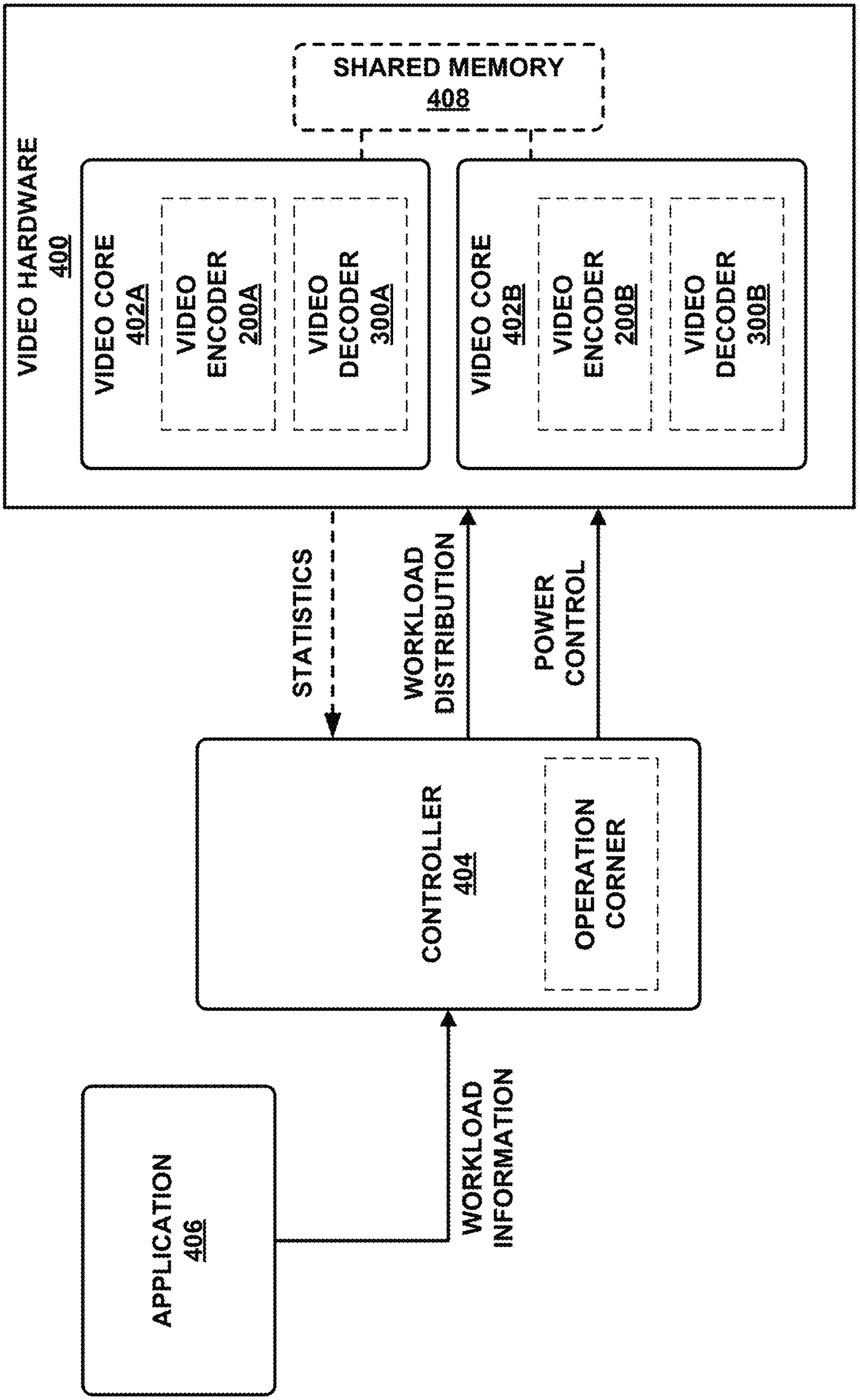
FIG. 4 is a block diagram illustrating an example of video hardware including multiple video cores, wherein each video core implements a video encoder and/or video decoder, and wherein the video cores are controlled by a controller that allocate coding sessions to the video cores according to techniques of this disclosure.

FIG. 4 is a block diagram illustrating an example of video hardware 400 including multiple video cores, e.g., video core 402A, video core 402B, etc., collectively referred to herein as “video cores 402.” Although two video cores 402 are shown in FIG. 4, video hardware 400 may include any number of video cores 402, e.g., two video cores, four video cores, eight video cores, etc. Each of video cores 402 may implement a video encoder, such as video encoder 200, a video decoder, such as video decoder 300, or a combination of both. For example, video core 402A may implement video encoder 200A and/or video decoder 300A, video core 402B may implement video encoder 200B and/or video decoder 300B, and so forth, where video encoders 200A and 200B are examples of video encoder 200 and video decoders 300A and 300B are examples of video decoder 300. In some examples, video cores 402 are similarly configured. In other examples, one or more of video cores 402 may implement a video encoder, such as video encoder 200 and one or more of video cores 402 may implement a video decoder, such as video decoder 300. In other examples, one or more of video cores 402 may implement a video encoder, such as video encoder 200, one or more of video cores 402 may implement a video decoder, such as video decoder 300, and one or more of video cores 402 may implement a combination of both. Video cores 402 may have similar or different processing capacities. However, the workload balancing techniques of this disclosure may provide a greater advantage to systems that include multiple cores with similar processing capacities.

Video cores 402 may be controlled by a controller 404 that performs workload balancing techniques of this disclosure to allocate coding sessions to video cores 402 in a manner that results in similar workloads across video cores 402, as will described in further detail below. Controller 404 may include any combination of hardware (e.g., processing circuitry), firmware, software, or any combination thereof. The workload balancing techniques of this disclosure may improve power efficiency and resource utilization by allocating similar workloads to video cores 402 regardless of whether the coding sessions themselves have unbalanced workload requirements (i.e., regardless of whether one coding session requires more hardware cycles than another coding session).

To achieve high pixel throughput for video processing, e.g., in automotive and compute markets, video systems may employ multi-core video hardware and coding techniques scheme. For example, controller 404 may allocate multiple coding sessions of 4K or Ultra High Definition (UHD) at 60 frames per second (UHD60FPS), which may be defined as 3840×2160 pixels at 60 frames per second, decoding to video core 402A and multiple coding sessions of 1080p or Full High Definition (FHD) at 30 frames per second (1080p30FPS), which may be defined as 1920×1080 pixels at 30 frames per second, encoding to video core 402B. In automotive applications, the workload (pixel throughput) requirement for each coding session of a group of concurrent coding sessions tends to be similar because cameras installed in a car may be similarly configured. As a result, each of video cores 402 may be allocated similar workloads without applying the workload balancing techniques of this disclosure.

However, unbalanced workloads are common in other applications, such as video transcoding or editing. For example, suppose a movie in 1080p24FPS (1920×1080 pixels at 24 frames per second) format is to be decoded and then re-encoded at 4K24FPS (3840×2160 at 24 frames per second). Before encoding, a graphics processing unit (GPU) may be used to process and/or filter YUV frames of the movie, such as artificial intelligence (AI) features based picture quality enhancement, super resolution, etc. In this example, allocating a 1080p24FPS decoding session to video core 402A and 4K24FPS encoding session to video core 402B results in the video cores 402 having significantly unbalanced workloads. For example, in table 500 of FIG. 5, it can be seen that coding session 2 at 4K24FPS (3840×2160×24 pixels per second) is four times more pixels per second than coding session 1 at 1080p24FPS (1920×1080×24 pixels per second).

Video hardware 400 may be configured to operate according to a power mode, referred to herein as an "operation corner." In some examples, video hardware 400, including video cores 402 may be in a multi-media power supply domain of a chipset. For this domain, video hardware 400 can operate at different operation corners. Table 600 in FIG. 6 includes example operation corners (L1-L8) and corresponding voltages (0.50V-0.85V). Because power consumption is proportional to the voltage squared, power consumption may be reduced by operating according to a lower operation corner (e.g., L1 operation corner at a voltage 0.50V versus L2 operation corner at a voltage 0.55V). It may be advantageous to operate video cores 402 according to the same operation corner as each other to avoid having a separate power supply for each of video cores 402, potentially resulting in increased hardware and circuit complexity. As a result, video cores 402 generally operate according to the same operation corner as each other regardless of the workload distribution across video cores 402. If coding sessions are allocated to video cores 402 on a "session(s) per core" basis, power and resource utilization inefficiencies may occur as a result of unbalanced workloads, as explained in more detail below.

In the example of allocating a 1080p24FPS decoding session to video core 402A and 4K24FPS encoding session to video core 402B, suppose that video core 402A may complete its workload on time if operated according to the L1 operation corner at 0.5V and that video core 402B may not complete its workload on time unless operated according the L2 operation corner. Consequently, controller 404 may need to operate video core 402A and video core 402B both according to the L2 operation corner at 0.55V. Operating at the L2 operation corner rather than operating at the L1 operation corner results in more power consumption. In this example, also suppose that video cores 402A and 402B can each take four times 4K24 such that video hardware 400 comprises a dual core system that can run four times concurrent 4k24 decoding and 4K24 encoding sessions. If 1080p24FPS decoding sessions are allocated to video core 402A and 4K24FPS encoding sessions are allocated to video core 402B, then video hardware 400 may only run four times 1080p24 decoding and 4K24 encoding sessions because, although video core 402A is capable of handling more than four times 1080p24 decoding sessions, it may not be possible to allocate more work to video core 402A when video core 402B reaches capacity at four times 4K24 encoding sessions. As can be seen from the foregoing example, workload scheduling on a session(s) per core basis may result in underutilization of one or more video cores, in addition to potential power inefficiency resulting from having to operate video hardware 400 according to an operation corner that fulfills a highest workload requirement of coding sessions to be concurrently allocated to video cores 402.

In examples of this disclosure, controller 404 is configured to determine an operation corner based on a workload requirement of a coding session. First, the controller 404 may be configured to determine the workload requirement of the coding session. For example, given a UHD60FPS bitstream, the controller 404 may be configured to determine how many hardware cycles one of video cores 402 would take to encode or decode UHD60FPS (3840×2160×60 pixels per second). In some examples, the controller 404 may be configured to determine the number of hardware cycles (i.e., the workload requirement) based on a video static performance model that projects the hardware speed of video cores 402. The video static performance model may comprise a mathematical representation that predicts how fast a video codec will compress static or mostly unchanging content within a video sequence, assessing its efficiency in handling scenes with minimal motion, like a still image within a video stream, by analyzing factors like pixel redundancy and spatial correlations.

In an example, controller 404 may determine that video hardware 400 will take 200M (Million) hardware cycles to encode or decode UHD60FPS. In this example, video cores 402 could be operated according to the L1 operation corner based on values in table 700 of FIG. 7. In the example of FIG. 7, video hardware frequency is 240 MHz at the L1 operation corner, providing more than 200M cycles per second to finish the workload on time. Accordingly, controller 404 may determine that the L1 operation corner fulfills the requirements of the coding session and may operate video cores 402 according to the voltage (e.g., 0.50V) corresponding to the L1 operation corner. This process of projecting minimally required cycles by video hardware 400 based on pixel rate workload and further determining which operation corner is sufficient to fulfill the workload requirements is often referred to as "operation corner voting" and may be based on a video static performance model that is used to determine (e.g., project/estimate) the workload requirement and the operation corner needed for a coding session, as discussed above.

Controller 404 may perform workload balancing techniques, as described below, to improve power efficiency and/or resource utilization of video hardware 400.

In the example of FIG. 4, controller 404 may receive workload information regarding concurrent coding sessions (i.e., coding sessions to be performed at least partially in parallel) from an application 406. In some examples, application 406 may be executed by controller 404 from memory 106 of source device 102 or memory 120 of destination device 116. In general, application 406 may be executed from any memory by controller 404 or other processing circuitry that is in communication with controller 404. Controller 404 may receive information about encoding and/or decoding sessions for two or more bitstreams from application 406 or from any other data source. In the dual core example of FIG. 4, controller 404 may be configured to receive information about a first coding session (e.g., coding session 1 of FIG. 5) and a second coding session (e.g., coding session 2 of FIG. 5).

Table 500 in FIG. 5 shows an example of two coding sessions, coding session 1 and coding session 2, that may be allocated to video core 402A and video core 402B to be performed at least partially in parallel. In an example, video hardware 400 may be configured to perform coding session 1 (a 1080P24FPS decoding session) in 150M cycles and coding session 2 (a 4K24FPS encoding session) in 300M cycles. Without applying workload balancing techniques of this disclosure, controller 404 may determine that it is appropriate to operate video hardware 400 at the L2 operation corner based on 300M cycles (i.e., the highest workload requirement of coding sessions 1 and 2) and based on the example operation corner and hardware frequency tables in FIGS. 6 and 7. However, using the same example values, controller 404 may determine that it is appropriate to operate video hardware 400 at the L1 operation corner when workload balancing techniques of this disclosure are applied.

According to techniques of this disclosure, controller 404 may be configured to determine an average workload requirement for coding sessions to be performed in parallel by video cores 402. For example, controller 404 may determine a first number of hardware cycles required to complete a first coding session and a second number of hardware cycles required to complete a second coding session. Controller 404 may then average the first number of hardware cycles and the second number of hardware cycles to compute the average workload requirement. In the example of FIGS. 5-7, the average workload requirement of coding session 1 and coding session 2 is 225M cycles ((150M+300M)/2). In some examples, controller 404 is configured to determine the first number of hardware cycles and the second number of hardware cycles based on a video static performance model, as previously discussed herein.

Controller 404 may be further configured to determine an operation corner based on the average workload requirement of the coding sessions. In some examples, controller 404 is configured to determine the operation corner sufficient to fulfill the average workload requirement based on operation corner voting, as previously discussed herein. In the example of FIGS. 5-7, controller 404 may determine that it is appropriate to operate video core 402A and video core 402B at the L1 operation corner based on the average workload requirement (225M cycles) of coding session 1 and coding session 2 and based on the example operation corner and hardware frequency tables in FIGS. 6 and 7. In the example of FIGS. 5-7, the operation corner based on the average workload (i.e., the L1 operation corner) is advantageously lower than the operation corner that would be selected based on the highest workload of coding sessions 1 and 2 (i.e., 300M cycles, corresponding to the L2 operation corner).

Controller 404 may be configured to operate video cores 402 at a voltage corresponding to the operation corner that was determined according to techniques described above. In some examples, controller 404 may transmit power control signals to operate video hardware 400 at the voltage corresponding to the operation corner. In the example of FIGS. 5-7, controller 404 may be configured to operate video hardware 400 including video cores 402 at 0.50V (corresponding to the L1 operation corner) based on the example operation corner and voltage values in table 600 of FIG. 6.

After an operation corner is set based on the average workload of the coding sessions to be performed in parallel by video cores 402, controller 404 allocates similar workloads to video cores 402 by allocating interleaved portions (e.g., groups of pictures (GOPs) or other uniformly sized or substantially uniformly sized divisions) of the coding sessions to video cores 402. In the dual core example of FIG. 4, controller 404 may be configured to allocate first interleaved portions of the first coding session (e.g., coding session 1) and the second coding session (e.g., coding session 2) to first video core 402A and second interleaved portions of the first coding session (e.g., coding session 1) and the second coding session (e.g., coding session 2) to video core 402B. For example, controller 404 may be configured to allocate the first GOP of the first coding session to video core 402A, the first GOP of the second coding session to video core 402B, the second GOP of the first coding session to video core 402B, the second GOP of the second coding session to video core 402A, and so on. In the example of FIGS. 5-7, controller 404 may be configured to allocate the first GOP of coding session 1 (1080P24FPS decoding) to video core 402A, the first GOP of coding session 2 (4K24FPS encoding) to video core 402B, the second GOP of coding session 1 (1080P24FPS decoding) to video core 402B, the second GOP of coding session 2 (4K24FPS encoding) to video core 402A, and so on.

In general, controller 404 may be configured to allocate interleaved portions of coding sessions to video cores 402 such that the workload of each coding session is shared by two or more of video cores 402 to achieve a substantially balanced distribution. Minor differences in workload distribution may occur until coding structure (e.g., GOP boundary) of a bitstream is determined; however, the differences may be negligible (e.g., a difference of one or few GOPs per core).

Figure 8:
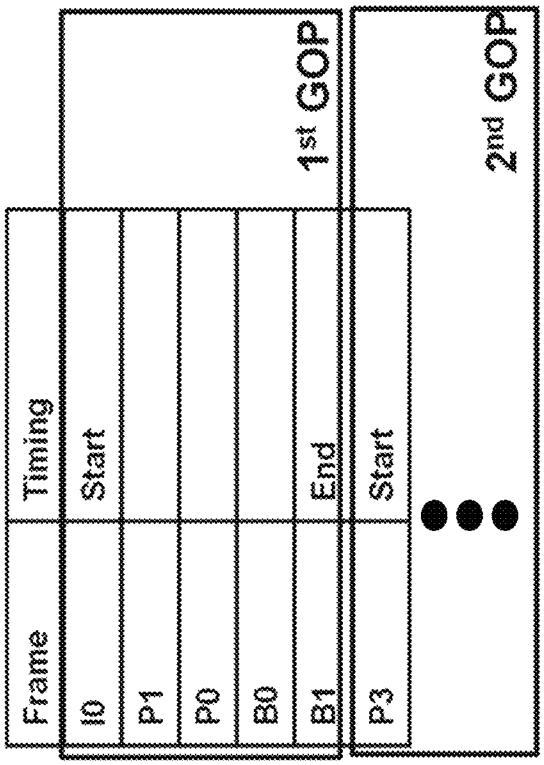
FIG. 8 is a conceptual diagram illustrating an example of group of pictures (GOP) boundaries of a bitstream.
Figure 9:
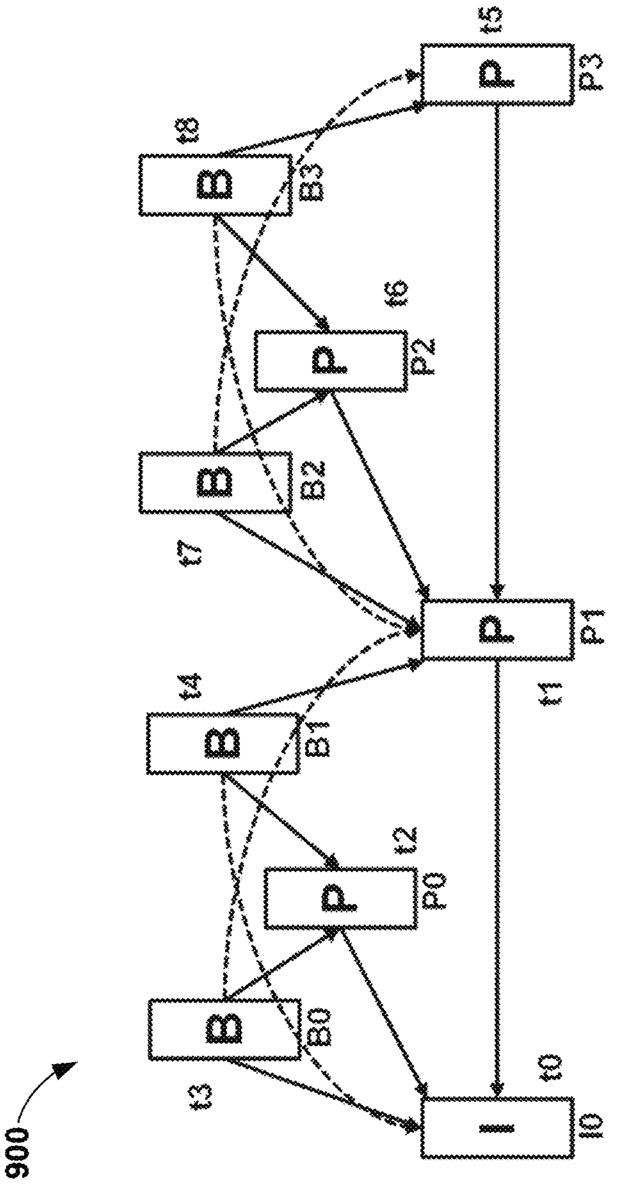
FIG. 9 is a conceptual diagram illustrating an example of a coding structure of a bitstream.

GOP structure is typically known to controller 404 (e.g., video firmware) before video hardware 400 starts a video encoding session. Thus, from the start of a video encoding session, controller 404 may allocate GOPs to different ones of video cores 402 to balance the workload of the encoding session across video cores 402. GOP structure of a video decoding session may not be known to controller 404 at the start of the video decoding session; however, GOP structure is normally repeated for a while within a bitstream. For example, FIGS. 8 and 9 illustrate examples of GOP boundaries within a bitstream 800 and coding structure 900 of the bitstream 800, respectively. After a GOP (e.g., the first GOP) of the bitstream is decoded at one of video cores 402, controller 404 may determine GOP boundaries of the bitstream and can then allocate GOPs of the video decoding session to different ones of video cores 402 to balance the workload of the decoding session across video cores 402. Thus, even in the case of video decoding, similar workloads (+/− one or few GOPs) may be allocated to video cores 402 to achieve a substantially balanced distribution.

In some examples, when controller 404 starts allocating a new decoding session, controller 404 is configured to allocate frames to one of video cores 402 (e.g., to video core 402A) and track each frame's reference structure. Controller 404 may determine the number of frames in one GOP when controller 404 begins or is ready to begin allocating a next GOP based on a next frame's reference structure. For example, the next frame's reference structure may indicate the start of the next GOP. Controller 404 may then launch frames of that GOP to another one of video cores 402 (e.g., to video core 402B) and then start launching GOPs of the coding session (and other concurrent coding sessions) to video cores 402 in an interleaved manner, as described above, to achieve a substantially balanced workload at each core. In some examples, controller 404 may launch two GOPs to one of video cores 402 before determining the GOP structure, depending on the bitstream coding structure. Additionally, if GOP structure changes in the middle of a bitstream, there may be a short period of time where one of video cores 402 receives more workload than another one of video cores 402. However, these slight differences in workload do not have much impact on the overall balance of workloads across video cores 402 when the video cores 402 are allocated multiple coding sessions to complete at least partially in parallel with one another according to the workload balancing techniques described above.

In some examples, video hardware 400 (e.g., video cores 402) may transmit statistics about the workload distribution to controller 404. For example, video cores 402 may transmit information about coding sessions and/or hardware performance data. Controller 404 may assess the balance of workload distribution and make changes (e.g., launch more portions of a coding session to one of video cores 402) based on the statistics.

Although several of the examples provided herein describe interleaved portions of coding sessions as GOPs, in other examples, coding sessions may be allocated based on a different granularity. For examples, coding sessions may be allocated to video cores 402 on multiple GOPs, a frame-by-frame basis or any other division of a bitstream that results in substantially balanced workload distribution across video cores 402. Depending on the coding structure of a bitstream and/or allocation granularity, video core 402A may need access to reference frame information of portions of information being coded by video core 402B, vice versa, and so forth. It may be advantageous for video core 402A and video core 402B to access a shared memory as inter-prediction techniques may utilize previously coded pictures that were processed by a different core. For example, if video core 402A processes a first GOP of a coding session, and then video core 402B processes the second GOP of the coding session, video core 402B may need access to some of the pictures coded by video core 402A to perform some inter-prediction processes. This is particularly the case if interleaved portions of a bitstream are not independently codable GOPs, but different granularities of video data (e.g., single frames). Accordingly, in some examples, video cores 402 may be configured to access a shared memory 408. The shared memory 408 may comprise a separate memory that is shared between respective memory structures (e.g., RAMs) of video cores 402. In some examples, the shared memory 408 is smaller than respective memory structures of video cores 402. In other examples, shared memory 408 may comprise a unified memory (e.g., unified RAM or RAM-like memory) for video cores 402.

Figure 10:
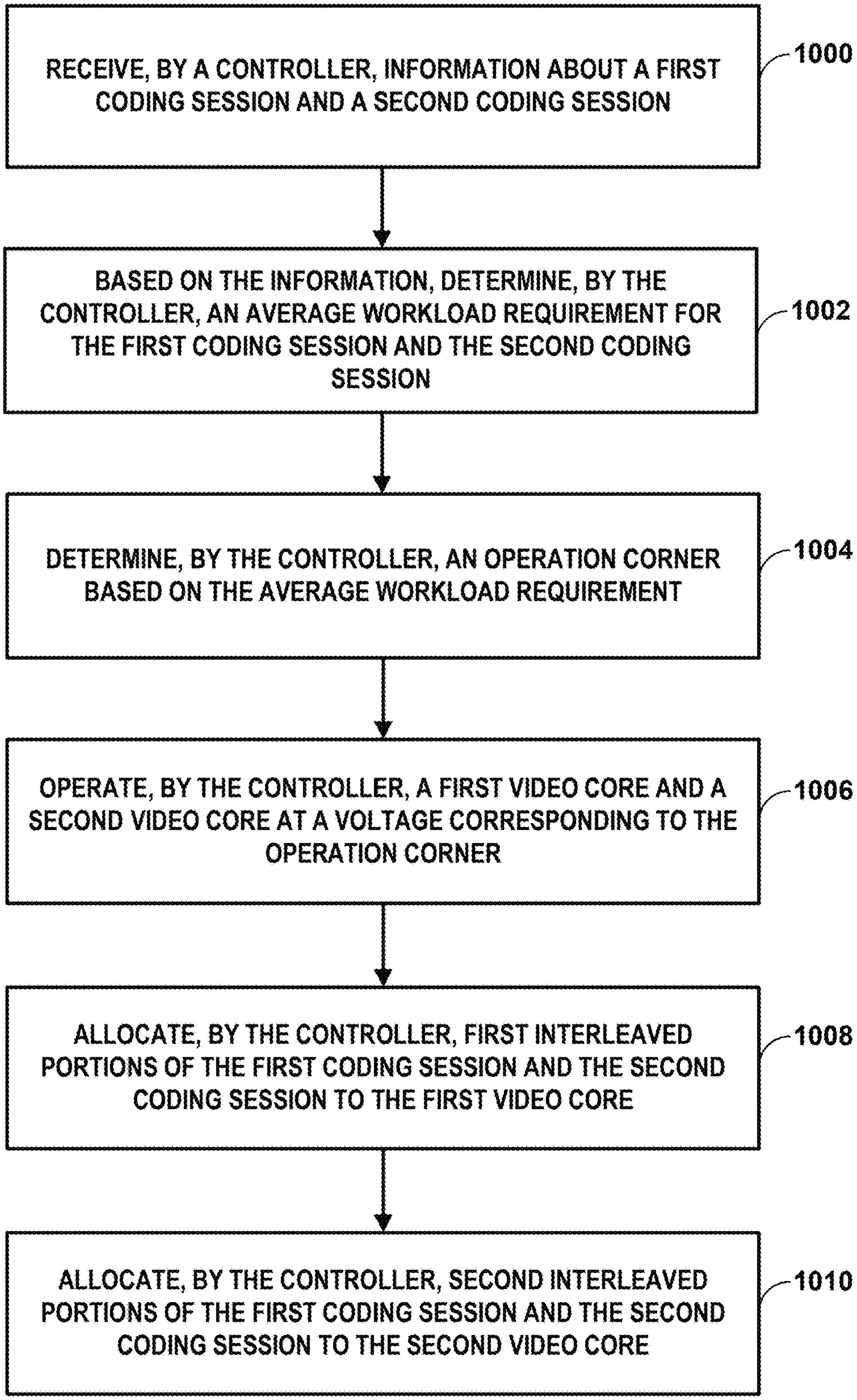
FIG. 10 is a flowchart illustrating an example of workload balancing for a multi-core video system.

FIG. 10 is a flowchart illustrating an example of workload balancing for a multi-core video system. The techniques of FIG. 10 may be performed by any controller described in this disclosure including controller 404 of FIG. 4.

Controller 404 receives information about a first coding session and a second coding session (1000). For example, controller 404 may receive workload information about the first and second coding sessions from application 406 or any other data source. The first coding session may have a different workload requirement than the second coding session. In some examples, the first coding session comprises a decoding session and the second coding session comprises an encoding session. In other examples, the first and second coding sessions are both encoding or decoding sessions.

Based on the information, controller 404 determines an average workload requirement for the first coding session and the second coding session (1002). For example, controller 404 may be configured to determine a first number of hardware cycles required to complete the first coding session and a second number of hardware cycles required to complete the second coding session. In some examples, the first number of hardware cycles and the second number of hardware cycles are determined based on a video static performance model. Controller 404 may comput the average workload requirement by averaging the first number of hardware cycles and the second number of hardware cycles.

Controller 404 determines an operation corner based on the average workload requirement of the first and second coding sessions (1004). For example, controller 404 may be configured to determine an operation corner sufficient to fulfill the average workload requirement based on operation corner voting. In some examples, the operation corner based on the average workload requirement is lower than at least one of a first operation corner for completing the first coding session with video core 402A/402B or a second operation corner for completing the second coding session with video core 402A/402B.

Controller 404 operates video core 402A and video core 402B at a voltage corresponding to the operation corner that was determined based on the average workload requirement of the first and second coding sessions (1006). For example, controller 404 may transmit at least one power signal to video hardware 400 that causes video core 402A and video core 402B to operate at the voltage corresponding to the operation corner.

Controller 404 allocates first interleaved portions of the first coding session and the second coding session to video core 402A (1008) and also allocates second interleaved portions of the first coding session and the second coding session to video core 402B (1010) to perform the first coding session and the second coding session at least partially in parallel. For example, controller 404 may be configured to allocate the first GOP of the first coding session to video core 402A, the first GOP of the second coding session to video core 402B, the second GOP of the first coding session to video core 402B, the second GOP of the second coding session to video core 402A, and so on.

Workload balancing techniques of this disclosure may provide a number of advantages. For example, multi-core video hardware 400 may run at a lower operation corner when performing concurrent coding sessions with unbalanced workload requirements. In the example of FIGS. 5-7, the reduced operation voltage with workload balancing versus without workload balancing results in significant power savings (e.g., at least 5-10%). In addition to improved power efficiency, workload balancing techniques of this disclosure may help optimize resource utilization. For instance, in the example of FIGS. 5-7, video core utilization is increased by approximately 60% with workload balancing versus without workload balancing.

The following numbered clauses illustrate one or more aspects of the devices and techniques described in this disclosure.

Clause 1. An apparatus configured to code video data comprises: a first video core; a second video core; and a controller configured to: receive information about a first coding session and a second coding session; based on the information, determine an average workload requirement for the first coding session and the second coding session; determine an operation corner based on the average workload requirement; operate the first video core and the second video core at a voltage corresponding to the operation corner; allocate first interleaved portions of the first coding session and the second coding session to the first video core; and allocate second interleaved portions of the first coding session and the second coding session to the second video core.

Clause 2. The apparatus of clause 1, wherein the first interleaved portions and the second interleaved portions of the first coding session and the second coding session comprise groups of pictures of respective bitstreams of the first coding session and the second coding session.

Clause 3. The apparatus of any of clauses 1 and 2, wherein the first coding session has a different workload requirement than the second coding session.

Clause 4. The apparatus of any of clauses 1-3, wherein the first coding session comprises a decoding session and the second coding session comprises an encoding session.

Clause 5. The apparatus of any of clauses 1-4, wherein the first video core and the second video core are configured to perform the first coding session and the second coding session at least partially in parallel.

Clause 6. The apparatus of any of clauses 1-5, wherein to determine the average workload requirement for the first coding session and the second coding session, the controller is configured to: determine a first number of hardware cycles required to complete the first coding session; determine a second number of hardware cycles required to complete the second coding session; and average the first number of hardware cycles and the second number of hardware cycles to compute the average workload requirement.

Clause 7. The apparatus of clause 6, wherein the controller is configured to determine the first number of hardware cycles and the second number of hardware cycles based on a video static performance model.

Clause 8. The apparatus of any of clauses 1-7, wherein the controller is configured to determine the operation corner based on operation corner voting.

Clause 9. The apparatus of any of clauses 1-8, wherein the operation corner based on the average workload requirement is lower than one of: a first operation corner for completing the first coding session with the first video core or the second video core; or a second operation corner for completing the second coding session with the first video core or the second video core.

Clause 10. The apparatus of any of clauses 1-9, wherein to allocate the first interleaved portions of the first coding session and the second coding session to the first video core and the second interleaved portions of the first coding session and the second coding session to the second video core, the controller is configured to: allocate a first session group of pictures (GOP) of the first coding session to the first video core; allocate a second session GOP of the second coding session to the second video core; allocate a next first session GOP of the first coding session to the second video core; and allocate a next second session GOP of the second coding session to the first video core.

Clause 11. A method of coding video data comprises: receiving, by a controller, information about a first coding session and a second coding session; based on the information, determining, by the controller, an average workload requirement for the first coding session and the second coding session; determining, by the controller, an operation corner based on the average workload requirement; operating, by the controller, a first video core and a second video core at a voltage corresponding to the operation corner; allocating, by the controller, first interleaved portions of the first coding session and the second coding session to the first video core; and allocating, by the controller, second interleaved portions of the first coding session and the second coding session to the second video core to perform the first coding session and the second coding session at least partially in parallel.

Clause 12. The method of clause 11, wherein the first interleaved portions and the second interleaved portions of the first coding session and the second coding session comprise groups of pictures of respective bitstreams of the first coding session and the second coding session.

Clause 13. The method of any of clauses 11 and 12, wherein the first coding session has a different workload requirement than the second coding session.

Clause 14. The method of any of clauses 11-13, wherein the first coding session comprises a decoding session and the second coding session comprises an encoding session.

Clause 15. The method of any of clauses 11-14, wherein determining, by the controller, the average workload requirement for the first coding session and the second coding session comprises: determining, by the controller, a first number of hardware cycles required to complete the first coding session; determining, by the controller, a second number of hardware cycles required to complete the second coding session; and averaging, by the controller, the first number of hardware cycles and the second number of hardware cycles to compute the average workload requirement.

Clause 16. The method of clause 15, wherein the first number of hardware cycles and the second number of hardware cycles are determined based on a video static performance model.

Clause 17. The method of any of clauses 11-16, wherein the operation corner is determined based on operation corner voting.

Clause 18. The method of any of clauses 11-17, wherein the operation corner based on the average workload requirement is lower than one of: a first operation corner for completing the first coding session with the first video core or the second video core; or a second operation corner for completing the second coding session with the first video core or the second video core.

Clause 19. The method of any of clauses 11-18, wherein allocating, by the controller, the first interleaved portions of the first coding session and the second coding session to the first video core and the second interleaved portions of the first coding session and the second coding session to the second video core comprises: allocating, by the controller, a first session group of pictures (GOP) of the first coding session to the first video core; allocating, by the controller, a second session GOP of the second coding session to the second video core; allocating, by the controller, a next first session GOP of the first coding session to the second video core; and allocating, by the controller, a next second session GOP of the second coding session to the first video core.

Clause 20. An apparatus configured to code video data comprises: a plurality of video cores; and a controller configured to: receive information about a plurality of coding sessions to be performed at least partially in parallel by the plurality of video cores; based on the information, determine an average workload requirement for the plurality of coding sessions; determine an operation corner based on the average workload requirement; operate the plurality of video cores at a voltage corresponding to the operation corner; and allocate interleaved portions of the plurality of coding sessions to the plurality of video cores.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to code video data, the apparatus comprising:

a first video core;

a second video core; and a controller configured to:

receive information about a first coding session and a second coding session;

based on the information, determine an average workload requirement for the first coding session and the second coding session;

determine an operation corner based on the average workload requirement;

operate the first video core and the second video core at a voltage corresponding to the operation corner;

allocate first interleaved portions of the first coding session and the second coding session to the first video core; and allocate second interleaved portions of the first coding session and the second coding session to the second video core.

2. The apparatus of claim 1, wherein the first interleaved portions and the second interleaved portions of the first coding session and the second coding session comprise groups of pictures of respective bitstreams of the first coding session and the second coding session.

3. The apparatus of claim 1, wherein the first coding session has a different workload requirement than the second coding session.

4. The apparatus of claim 1, wherein the first coding session comprises a decoding session and the second coding session comprises an encoding session.

5. The apparatus of claim 1, wherein the first video core and the second video core are configured to perform the first coding session and the second coding session at least partially in parallel.

6. The apparatus of claim 1, wherein to determine the average workload requirement for the first coding session and the second coding session, the controller is configured to:

determine a first number of hardware cycles required to complete the first coding session;

determine a second number of hardware cycles required to complete the second coding session; and average the first number of hardware cycles and the second number of hardware cycles to compute the average workload requirement.

7. The apparatus of claim 6, wherein the controller is configured to determine the first number of hardware cycles and the second number of hardware cycles based on a video static performance model.

8. The apparatus of claim 1, wherein the controller is configured to determine the operation corner based on operation corner voting.

9. The apparatus of claim 1, wherein the operation corner is lower than one of: a first operation corner for completing the first coding session with the first video core or the second video core; or a second operation corner for completing the second coding session with the first video core or the second video core.

10. The apparatus of claim 1, wherein to allocate the first interleaved portions of the first coding session and the second coding session to the first video core and the second interleaved portions of the first coding session and the second coding session to the second video core, the controller is configured to:

allocate a first session group of pictures (GOP) of the first coding session to the first video core;

allocate a second session GOP of the second coding session to the second video core;

allocate a next first session GOP of the first coding session to the second video core; and allocate a next second session GOP of the second coding session to the first video core.

11. A method of coding video data, the method comprising:

receiving, by a controller, information about a first coding session and a second coding session;

based on the information, determining, by the controller, an average workload requirement for the first coding session and the second coding session;

determining, by the controller, an operation corner based on the average workload requirement;

operating, by the controller, a first video core and a second video core at a voltage corresponding to the operation corner;

allocating, by the controller, first interleaved portions of the first coding session and the second coding session to the first video core; and allocating, by the controller, second interleaved portions of the first coding session and the second coding session to the second video core to perform the first coding session and the second coding session at least partially in parallel.

12. The method of claim 11, wherein the first interleaved portions and the second interleaved portions of the first coding session and the second coding session comprise groups of pictures of respective bitstreams of the first coding session and the second coding session.

13. The method of claim 11, wherein the first coding session has a different workload requirement than the second coding session.

14. The method of claim 11, wherein the first coding session comprises a decoding session and the second coding session comprises an encoding session.

15. The method of claim 11, wherein determining, by the controller, the average workload requirement for the first coding session and the second coding session comprises:

determining, by the controller, a first number of hardware cycles required to complete the first coding session;

determining, by the controller, a second number of hardware cycles required to complete the second coding session; and averaging, by the controller, the first number of hardware cycles and the second number of hardware cycles to compute the average workload requirement.

16. The method of claim 15, wherein the first number of hardware cycles and the second number of hardware cycles are determined based on a video static performance model.

17. The method of claim 11, wherein the operation corner is determined based on operation corner voting.

18. The method of claim 11, wherein the operation corner is lower than one of: a first operation corner for completing the first coding session with the first video core or the second video core; or a second operation corner for completing the second coding session with the first video core or the second video core.

19. The method of claim 11, wherein allocating, by the controller, the first interleaved portions of the first coding session and the second coding session to the first video core and the second interleaved portions of the first coding session and the second coding session to the second video core comprises:

allocating, by the controller, a first session group of pictures (GOP) of the first coding session to the first video core;

allocating, by the controller, a second session GOP of the second coding session to the second video core;

allocating, by the controller, a next first session GOP of the first coding session to the second video core; and allocating, by the controller, a next second session GOP of the second coding session to the first video core.

20. An apparatus configured to code video data, the apparatus comprising:

a plurality of video cores; and a controller configured to:

receive information about a plurality of coding sessions to be performed at least partially in parallel by the plurality of video cores;

based on the information, determine an average workload requirement for the plurality of coding sessions;

determine an operation corner based on the average workload requirement;

operate the plurality of video cores at a voltage corresponding to the operation corner; and allocate interleaved portions of the plurality of coding sessions to the plurality of video cores.

* * * * *